United States Patent
Stoutenburgh et al.

(10) Patent No.: US 6,392,829 B1
(45) Date of Patent: May 21, 2002

(54) ALTERNATE RANDOMIZING FOR EVEN/ODD DATA TRACKS

(75) Inventors: Joseph S. Stoutenburgh, Hopkins; Forrest C. Meyer, Eden Prairie, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/177,167

(22) Filed: Oct. 22, 1998

Related U.S. Application Data
(60) Provisional application No. 60/063,596, filed on Oct. 23, 1997.

(51) Int. Cl.[7] .................................................. G11B 5/09
(52) U.S. Cl. ............................ 360/39; 360/53; 360/75; 360/78.04
(58) Field of Search ................................. 360/53, 39, 48, 360/75, 55, 78.01, 78.04

(56) References Cited

U.S. PATENT DOCUMENTS

| | | | |
|---|---|---|---|
| 5,208,711 A | 5/1993 | Kitamura et al. | 360/78.04 |
| 5,784,216 A | 7/1998 | Zaharris | 360/48 |
| 5,850,382 A | * 12/1998 | Koishi et al. | 360/275.3 |

\* cited by examiner

*Primary Examiner*—Andrew L. Sniezek
(74) *Attorney, Agent, or Firm*—Theodore M. Magee; Westman, Champlin & Kelly, P.A.

(57) ABSTRACT

The present invention provides a method and storage device for reducing the occurrence of data miscompare errors. The method includes identifying a destination track as either an even track or an odd track and selecting a pseudo-random set of data based on this identification. The pseudo-random set of data is combined with write data to produce randomized data that is used as the basis for a write signal to be written to the destination track.

18 Claims, 8 Drawing Sheets

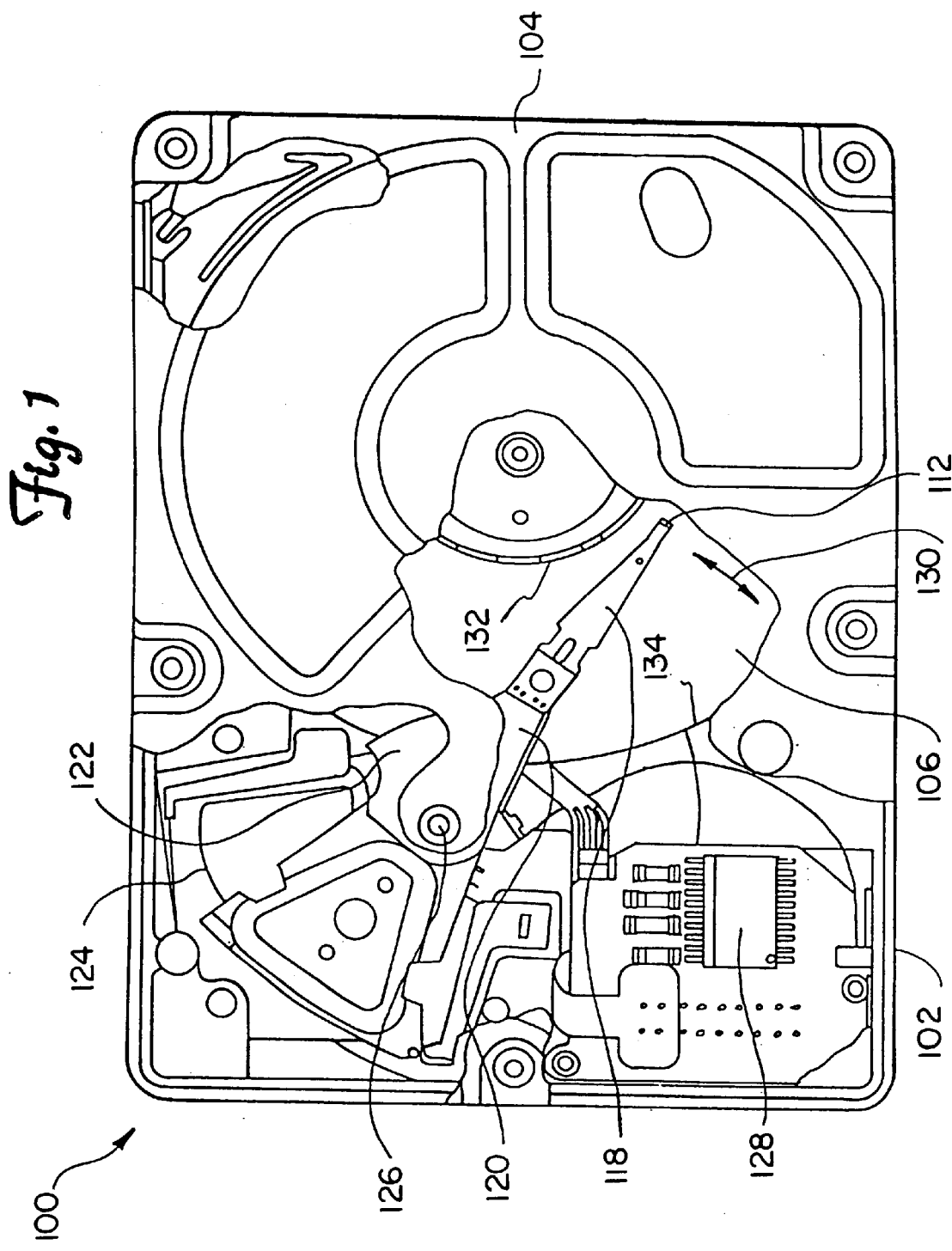

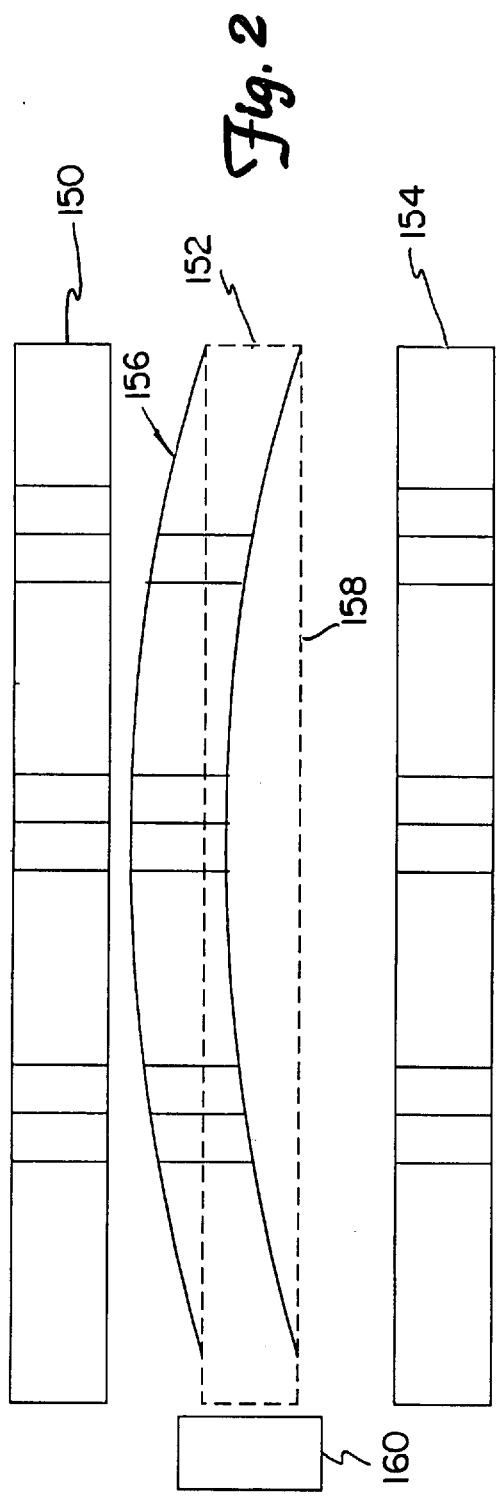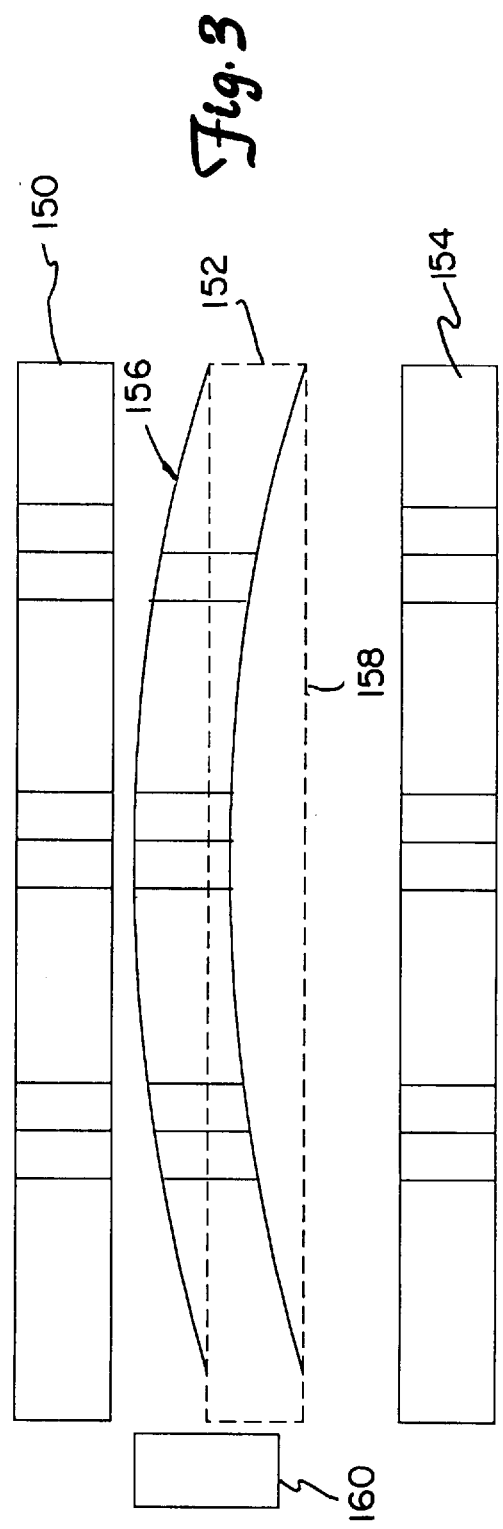

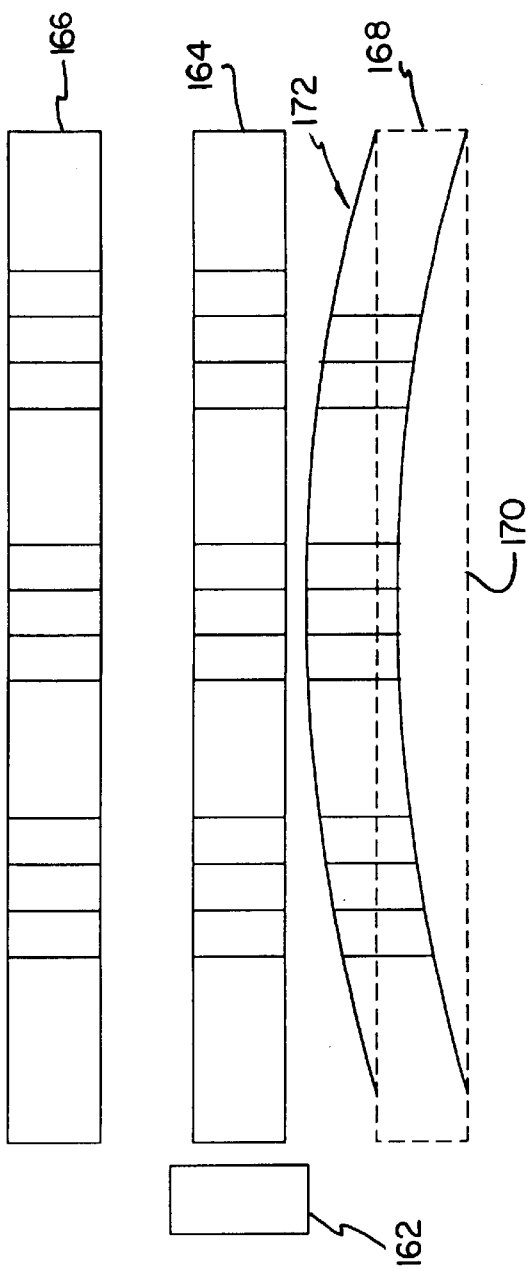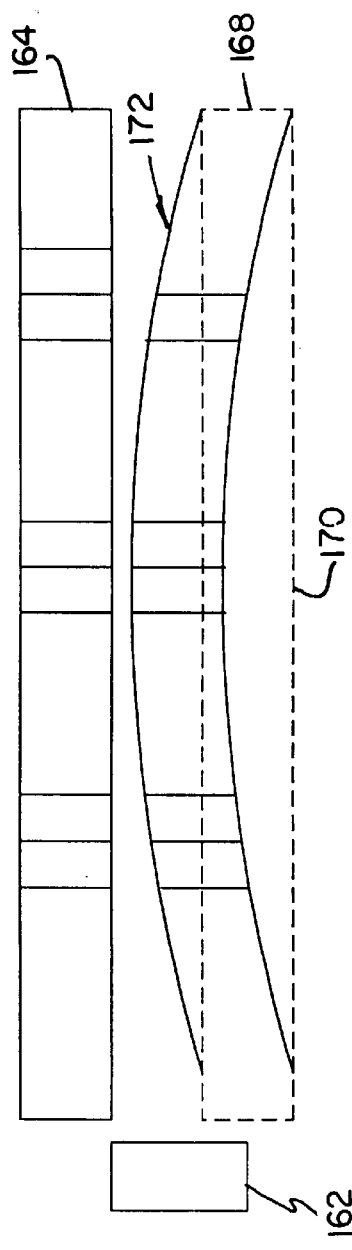

ALTERNATE RANDOMIZING FOR EVEN/ODD DATA TRACKS

REFERENCE TO RELATED APPLICATION

The present application claims priority benefits from U.S. Provisional Applications Serial No. 60/063,596 Filed on Oct. 23, 1997.

FIELD OF THE INVENTION

The present invention relates to storage devices that store data on media. In particular, the present invention relates to encoding techniques for reducing errors in recovered data.

BACKGROUND OF THE INVENTION

Storage devices store data along tracks embedded in storage media. In storage devices that use discs, the tracks are concentric around the rotational axis of the disc. In tape based storage devices, the tracks are formed along parallel paths that run in the direction of the movement of the tape. In either case, the storage device writes data by positioning a head over a destination track and altering a localized portion of the medium. To recover the data, the storage device must position a read head over the same track and sense a localized characteristic of the medium indicative of the alteration performed by the write head.

The positioning of the head during reading and writing operations is critical to the proper recovery of stored data. If the write head is not properly positioned over a track during write operations, data will be written outside of the location where the storage device expects it. This can cause read errors because the storage device attempts to place the read head directly over the track where it expects to find the data. If the data is outside of this location, the read head may not be able to read the data, resulting in a read error.

Many storage devices have the ability to recover from such read errors. Specifically, as part of a recovery routine, many devices shift the read head from the ideal track layout and attempt to recover data that has been written outside of the ideal track. If the read head successfully reads the data, the storage device continues with the remainder of the read operation. If the read head can not read the data, it reports an unrecoverable error.

As track densities increase on media, the head-shifting recovery technique has created additional problems. Specifically, shifting the read head outside of the ideal track layout can cause the read head to move into an adjacent track. If the read head successfully reads data from the adjacent track, it is possible that the storage device will incorrectly identify the recovered data as belonging to the original target track and not as belonging to the neighboring track. This type of error is known as a data miscompare.

Such errors are undesirable because they cause the disk drive to report that there was no error in recovering the data when in fact incorrect data has been returned to the host computer. Such errors are extremely difficult to identify and can lead to serious consequences in the operation of the computer.

SUMMARY OF THE INVENTION

The present invention provides a method and storage device for reducing the occurrence of data miscompare errors. The method includes identifying a destination track as either an even track or an odd track and selecting a pseudo-random set of data based on this identification. The pseudo-random set of data is combined with write data to produce randomized data that is used as the basis for a write signal to be written to the destination track.

In further embodiments of the present invention, the method also includes identifying a source track as either an even track or an odd track. A read signal is then produced by reading from the source track. Randomized read data is extracted from the read signal and is combined with a pseudo-random set of data to reproduce the data originally written on the track. The pseudo-random set of data is selected on the basis of whether the source track is an even track or an odd track.

BRIEF DESCRIPTION OF THE DRAWINGS

FIG. 1 is a plan view of one type of storage device in which the present invention may be practiced.

FIG. 2 is a top view of a storage medium's data track layout showing a non-ideal written track.

FIG. 3 is a top view of a storage medium's data track layout showing a non-ideal written track with a head shifted to recover a written track.

FIG. 4 is a top view of a storage medium's data track layout with a non-ideal written track neighboring a track being read by a head.

FIG. 5 is a top view of a storage medium's data track layout showing a head shifted toward a non-ideal written track.

DETAILED DESCRIPTION OF THE PREFERRED EMBODIMENTS

Figure 6:
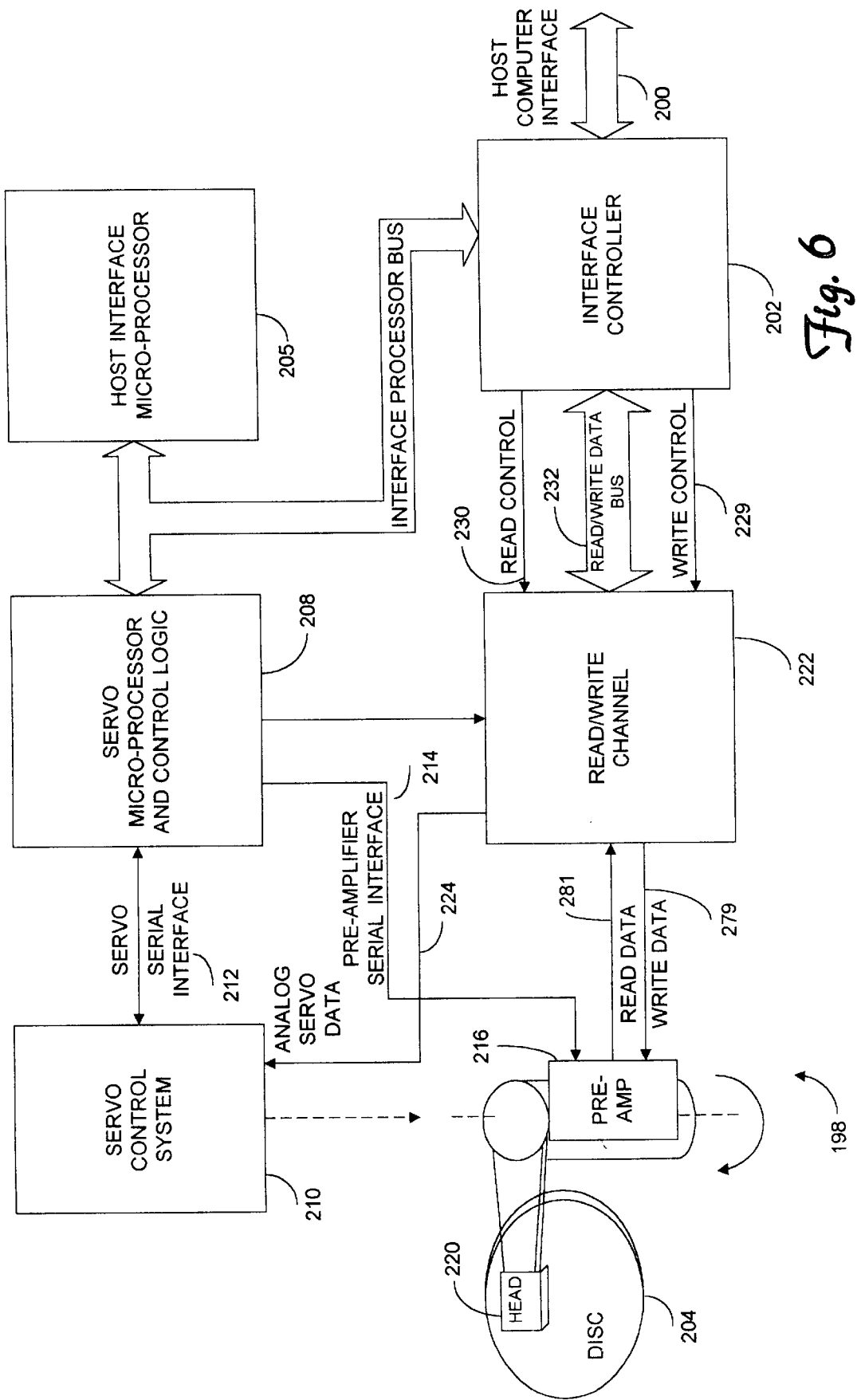
FIG. 6 is a block diagram of a disk drive.

FIG. 1 is a plan view of a disc drive 100 that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs, which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an arcuate path 130 between a disc inner diameter 132 and a disc outer diameter 134. When the head is properly positioned, write circuitry within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

FIGS. 2, 3, 4, and 5 are top views of track layouts that are useful in describing the data miscompare errors that the present invention attempts to avoid.

Specifically, FIG. 2 is a top view of a storage medium's track layout showing three tracks 150, 152, and 154. Although shown as parallel tracks, those skilled in the art will recognize that for a disk drive storage device, tracks 150, 152, and 154 are actually concentric about each other.

Within tracks 150 and 154, the written data follows the expected track layout. However, the written data 156 for track 152 does not follow the ideal track layout 158. In fact, written data 156 bows outward toward track 150 from ideal track layout 158. Because of this, bowing, a read head 160 attempting to follow the expected track layout 158 will not encounter the full width of data 156. This can cause read errors if the portions of written data 156 read by read head 160 are obscured by signals generated by portions of the medium found in expected track layout 158.

In general, storage devices are able to identify read errors generated by the bowing effect shown in FIG. 2 through a number of known encoding techniques. These encoding techniques include error correction codes. If a storage device detects such an error, it attempts to apply several different recovery techniques to recover the data. One such technique is to shift the read head from the expected track line to see if the data has simply been written off track.

FIG. 3 depicts such an error recovery technique using the track layout of FIG. 2. In FIG. 3, read head 160 has been shifted toward track 150. Based on the track layout shown in FIGS. 2 and 3, such shifting will allow the head to read more of written data 156 and thus will likely allow the head to recover the data written to track 152.

Although head shifting will likely result in the recovery of data in FIG. 3, under certain circumstances, such as those shown in FIGS. 4 and 5, such head shifting will result in a data miscompare error. FIG. 4 depicts a top view of a track layout on a storage medium where a read head 162 is attempting to read corrupted data from a track 164. Track 164 is located between track 166 and track 168, where track 168 has an ideal track layout 170 and an actual written data track 172 that bows toward track 164.

Since the data of track 164 is corrupted, the storage device will try to recover the data using various recovery techniques. This will sometimes include shifting the read head outside of the ideal track line to see if the data has simply been written off track. In FIG. 5, the storage device has shifted head 162 toward neighboring track 168 to see if the data for track 164 has simply been written off track in the direction of track 168. As shown in FIG. 5, this head shifting causes read head 162 to pass over written data 172 of neighboring track 168.

If read head 162 reads enough data from written data 172, the storage device may incorrectly determine that it has successfully recovered data associated with track 164 when in fact it has recovered data associated with neighboring track 168. As noted above, this type of error is known as a data miscompare error and its rate of occurrence is reduced by the present invention.

FIG. 6 is a block diagram of a disk drive 198 representing one embodiment of a storage device of the present invention. Disk drive 198 communicates with a host computer through a host computer interface 200, which is connected to an interface controller 202 within disk drive 198. When the host computer wishes to write data to a disk 204, it passes host data packets to interface controller 202. The host data packets contain data and associated logical block addresses that identify where the data should be stored on disk 204. In preferred embodiments, this information is sent along a serial interface within host computer interface 200 and is parsed into parallel data values by interface controller 202.

For each data packet, interface controller 202 separates the data from the logical block address, and passes the logical block address to host interface microprocessor 205.

Host interface microprocessor 205 determines a cylinder and sector for the data based on the logical block address. In preferred embodiments, where the storage device is a multi-disc drive, host interface microprocessor 204 also determines the head to use to write the data to a disc. In this context, a track consists of a particular head applied against a cylinder on a particular disc.

Host interface microprocessor 204 sends the head and cylinder identification to servo microprocessor and control logic (SMCL) 208. SMCL 208 converts the parallel cylinder address information into a serial signal that is passed to servo control system 210 over a serial interface 212. SMCL 208 also uses the head identification to select the desired head through a preamplifier serial interface 214 that connects to preamplifier 216.

Based on the cylinder value it receives along servo serial interface 212, servo control system 210 rotates head 220 over disk 204. Head 220 reads servo information from the disc as it rotates and provides this servo information to read/write channel 222. Read/write channel 222 forwards this servo information as analog servo data 224 to servo control system 210, which further corrects the position of the head to finally locate the head at the desired cylinder.

As servo control system 210 is positioning head 220, host interface microprocessor 205 prepares read/write channel 222 to write information to the disc. In particular, host interface microprocessor 205 uses the cylinder identification to create a control byte, which it passes to servo microprocessor and control logic (SMCL) 208 as a parallel data value. In addition, host interface microprocessor 205 passes a register address that identifies a register in read/write channel 222 where the control byte is to be stored. SMCL 208 converts the parallel control byte into a serial value and appends the register address to the serial value. SMCL 208 then passes the register address and the control byte to read/write channel 222, which stores the control byte in the appropriate register.

At the same time, interface controller 202 calculates error correction codes for the input data and appends the error correction codes to the data. Such error correction codes are well known in the art.

When servo control system 210 has positioned head 220 over the proper cylinder, it passes a signal to servo microprocessor and control logic (SMCL) 208 over servo serial interface 212. SMCL 208 passes this information to interface controller 202, which generates a write control signal that is passed to read/write channel 222 along write control line 229. The write control signal indicates to read/write channel 222 that it should begin to write data to the disk. At the same time, interface controller 202 passes the input data and its associated ECC data to read/write channel 222 along read/write data bus 232.

Before writing the data to the disk, read/write channel 222 randomizes the input data and the ECC data to reduce undesirable effects that fixed patterns have on the performance of the read/write channel. The particular randomization performed by read/write channel 222 is controlled in part by a randomizer control value found in the control byte produced by host interface microprocessor 205. The nature of the randomization is discussed further below.

During read operations, the host computer passes a logical block address over host computer interface 201) to host interface controller 202, along with a request to read the information at the logical block address. Interface controller 202 passes the logical block address to host interface microprocessor 205, which identifies the head, cylinder and sector based on the logical block address. Host interface microprocessor 205 passes the head and cylinder information through servo microprocessor and control logic 208 to servo control system 210 in a manner similar to that described above for write operations.

Servo control system 210 positions head 220 at the desired cylinder using analog servo data 224 provided by read/write channel 222. Once the head is in the desired position, servo control system 210 passes a signal through servo serial interface 212, and servo microprocessor and control logic 208 to interface controller 202.

While servo control system 210 is positioning the head, host interface microprocessor 205 creates a control byte based on the desired cylinder. This control byte is sent as a parallel value to servo microprocessor and control logic 208, which converts it into a serial control byte. Host interface microprocessor 205 also passes a register address to servo microprocessor and control logic 208, which converts the parallel register address into a serial address and appends the serial address to the serial control byte. The combined control byte and register address is passed to read/write channel 222 where the control byte is stored in a register identified by the register address.

Upon receiving confirmation that servo control system 210 has positioned the head over the desired cylinder, interface controller 202 sends a signal over read control line 230 to read/write channel 222. The signal on read control line 230 causes read/write channel 222 to accept data read from disc 204 by head 220.

Read/write channel 222 derandomizes the randomized data and error correction codes read from the disc. The randomized data and error correction codes are derandomized based on the randomizer control value in the control byte produced by host interface microprocessor 205.

The derandomized data and error correction codes are passed in parallel format to interface controller 202 across read/write data bus 232. Interface controller 202 then determines if the read data is correct based on the error correction codes. If the data is correct, interface controller 202 passes the data to the host computer through host computer interface 200. If the data is not correct, interface controller 202 indicates that there has been an error in reading the data.

Figure 7:
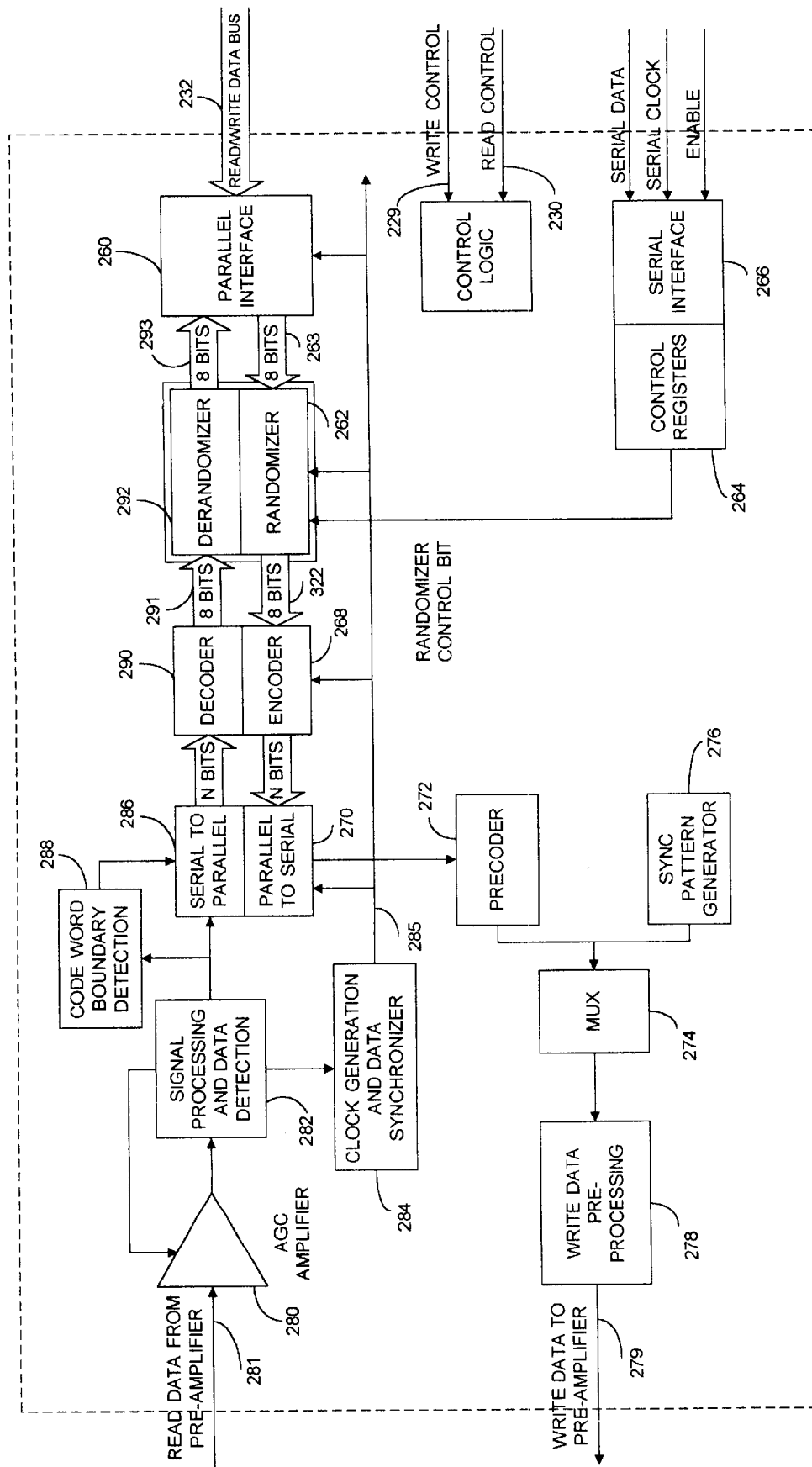
FIG. 7 is a block diagram of the read write channel of FIG. 6.

FIG. 7 is a block diagram of read/write channel 222 of FIG. 6. Read/write data bus 232 of FIG. 6 connects to a parallel interface 260. During a write operation, parallel interface 260 takes parallel information on read/write data bus 232 and provides it to a randomizer 262 in eight-bit bytes as input data 263.

Randomizer 262 randomizes input data 263 based upon a randomizer control value found in a control byte within a control register 264. Control register 264 is the register discussed above that is set by servo microprocessor and control logic 208 of FIG. 6.

Specifically, servo microprocessor and control logic (SMCL) 208 sets control register 264 through serial interface 266, which receives the control byte and the address of control register 264 in a serial format from SMCL 208. Serial interface 266 converts the serial control byte into a parallel control byte and based upon the serial register address, stores the parallel control byte in control register 264 In some embodiments, the control byte stored in control register 264 includes additional control bits beyond the randomizer control value that are used for different control purposes. In other embodiments, the entire control byte is the control value.

Randomizer 262 produces an eight-bit byte of randomized data 322 for each eight-bit byte of input data 263 that it receives. Each eight-bit byte of randomized data 322 is provided to encoder 268, which encodes randomized data 322 using, for example, a run-length-limited code. Encoder 268 produces an N-bit encoded output that is provided to parallel-to-serial converter 270, which converts the parallel N-bits into a serial signal.

The serial signal is provided to a precoder 272, which applies channel specific encoding to the serial signal to produce an output signal that is provided to multiplexer 274. Multiplexer 274 passes either the output signal from precoder 272 or the output from a synchronization pattern generator 276. Synchronization pattern generator 276 is used to generate synchronization patterns that are placed in a field before the data on the track. The signal passed by multiplexer 274 is provided to write data pre-processing circuit 278 which performs further processing designed specifically for the write head of the disc drive. Write data pre-processing 278 then provides a write signal 279 to preamplifier 216 of FIG. 6.

During read operations, read data 281 is received from preamplifier 216 by automatic gain control (AGC) amplifier 280. AGC amplifier 280 adjusts the amplitude of the read signal and provides an adjusted read signal to signal processing and data detection circuit 282. Based on the adjusted read signal, signal processing and data detection circuit 282 provides a feed back signal to AGC amplifier 280 to help control the amplitude of the adjusted read signal.

Signal processing and data detection circuit 282 also provides timing pulses to a clock generation and data synchronization circuit 284. Based on these timing pulses, clock generation and data synchronization circuit 284 creates a clock signal 285 that is synchronized to the data read from the disc. Since clock signal 285 is provided to the remaining elements of the read circuit, it allows the read circuit to operate at bit boundaries of the read data.

Signal processing and data detection 282 also provides a serial data signal to serial-to-parallel convertor 286 and code word boundary detector 288. Code word boundary detector 288 determines the boundaries of code words in the serial data signal and generates a boundary detect signal synchronized to those boundaries. Serial-to-parallel converter 286 uses the boundary detect signal to convert the data signal into parallel N-bit codewords.

Serial-to-parallel converter 286 provides its N-bit codewords to decoder 290, which applies the inverse of the encoder rules used by encoder 268. This results in 8-bit bytes of randomized read data 291 that are provided in parallel to derandomizer 292. Derandomizer 292 derandomizes the previously randomized read data 291 using a set of pseudo-random data that is based on the value of the randomizer control value in control register 264, which is set for read operations in the same manner as discussed above for write operations. The operation of derandomizer 292 is discussed further below.

After derandomizing the randomized data, derandomizer 292 provides derandomized data 293 to parallel interface 260, which places the parallel data on read/write data bus 232.

Figure 8:
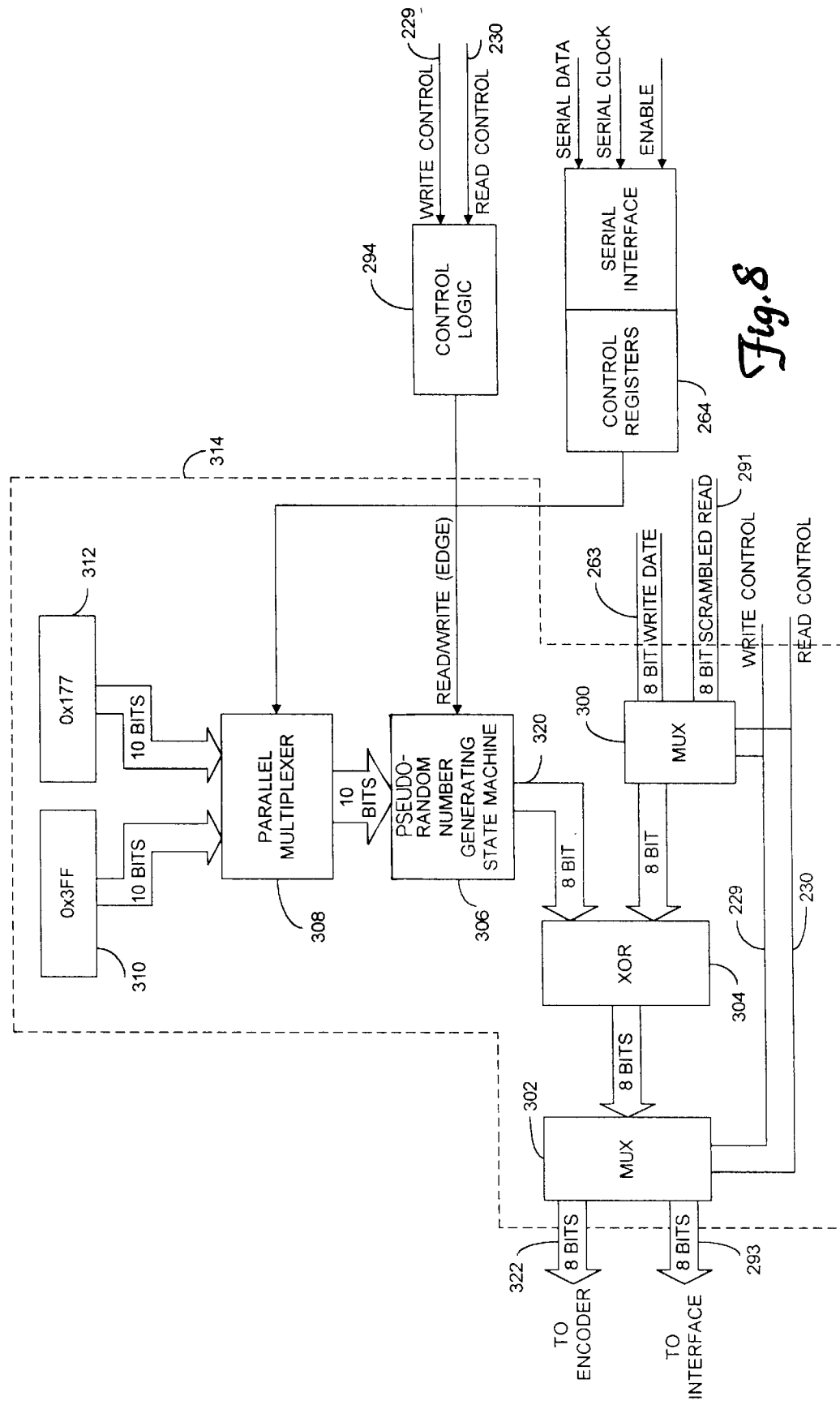
FIG. 8 is a block diagram of the randomizer and derandomizer of FIG. 7.

FIG. 8 is a block diagram of randomizer 262 and derandomizer 292 of FIG. 7. In the preferred embodiment shown in FIG. 8, randomizer 262 and derandomizer 292 share some components. The combined operation is achieved using two multiplexers 300 and 302, which are controlled by write control 229 and read control 230.

During write operations, write control 229 causes multiplexer 300 to pass input data 263 from parallel interface 260 to an X-OR (exclusive OR) circuit 304. X-OR circuit 304 also receives 8-bit bytes of pseudo-random data from a random number generating state machine 306. The 8-bit bytes of pseudo-random data are timed to appear at X-OR circuit 304 at the same time as the 8-bit bytes of input data 263 passing through multiplexer 300. For each separate byte of input data, a separate byte of pseudo-random data is provided by random number generated state machine 306.

The numbers generated by random number generating state machine 306 are pseudo-random in that the numbers have no apparent relation to each other. However, the numbers are not completely random because random number generating state machine 306 will produce the same set of numbers in the same order each time it is reset if it is initialized with the same randomizer seed. For different randomizer seeds, random number generating state machine 306 will provide different sets of pseudo-random data.

In some embodiments, random number generating state machine 306 is reset by control logic 294, which sends a reset signal based on the edge of write control signal 229 during write operations. After being reset, random number generating state machine 306 begins to generate a set of pseudo-random data beginning from a randomizer seed it receives from parallel multiplexer 308.

In some embodiments, parallel multiplexer 308 provides a 10 bit randomizer seed that it selects from two available randomizer seeds. In one of these embodiments, the two randomizer seeds that parallel multiplexer 308 can select from are 3FF hexadecimal and 177 hexadecimal, which are stored in two memories 310 and 312, which are connected to parallel multiplexer 308. In these embodiments, parallel multiplexer 308 makes its selection between the two available randomizer seeds based upon the value of the randomizer control value from control register 264. In one of these embodiments, the control value is a bit and when the control bit is zero, parallel multiplexer 308 selects randomizer seed 3FF hexadecimal and when the control bit is one, parallel multiplexer 308 selects randomizer seed 177 hexadecimal.

In other embodiments, the randomizer control value contains the randomizer seed. In such embodiments, multiplexer 308 and memories 310 and 312 are not present and the control value is provided directly to random number generating state machine 306 by control register 264.

X-OR circuit 304 performs an exclusive-OR logic operation on a bit-by-bit basis between each 8-bit byte of input data and each corresponding 8-bit byte of pseudo-random data to produce a set of 8-bit bytes of randomized data. The 8-bit bytes of randomized data are sequentially provided to multiplexer 302, which directs randomized data 322 to encoder 268 of FIG. 7.

During read operations, read control signal 230 causes multiplexer 300 to pass 8-bit bytes of randomized read data 291 from decoder 290 to X-OR circuit 304. X-OR circuit 304 performs an exclusive-OR logic operation using randomized read data 291 and a set of pseudo-random data 320 provided by random number generating state machine 306. The output of X-OR circuit 304 is provided to multiplexer 302, which, under the control of read control signal 230, directs the output as read data 293 to parallel interface 260 of FIG. 7.

During read operations, pseudo-random data 320 is generated by random number generating state machine 306 in response to a reset signal provided by control logic 294 and a randomizer seed. The reset signal is provided on the basis of an edge in read control signal 230 and resets state machine 306 so that it begins to generate numbers starting from the randomizer seed.

In some embodiments, one of two possible randomizer seeds is passed by parallel multiplexer 308 depending on, the value of a randomizer control bit found in control register 264. In one of these embodiments, when the randomizer control bit is "1", parallel multiplexer 308 passes randomizer seed 177 hexadecimal of memory 312, and when the randomizer control bit is "0", parallel multiplexer 308 passes randomizer seed 3FF hexadecimal of memory 310.

In other embodiments, the randomizer seed is provided directly by control registers 264 as described above in connection with randomizing data.

In order to derandomize the previously randomized read data 291 using X-OR circuit 304, the pseudo-random set of data applied to X-OR circuit 304 must match the pseudo-random set of data that was used to randomize the corresponding input data before writing it to the disc. In other words, the same set of pseudo-data must be used to randomize and derandomize a particular set of input data.

If the pseudo-data used to derandomize the randomized read data differs from the pseudo-data used to randomize the corresponding input data, the resulting read data will contain errors that are easily identified by current error correction code techniques.

Under the present invention, if the data being read actually belongs to the nominal cylinder that host interface microprocessor 205 expects to be reading, the pseudo-random set of data generated by random number generating state machine 306 will match the pseudo-random set of data used to randomize the corresponding input data. However, if the read head is actually reading a neighboring track and not the track that host interface 205 expects to be reading, the pseudo-random set of data generated by random number generating state machine 306 will be completely different from the pseudo-random set of data used to randomize the neighboring data.

This follows from the fact that in preferred embodiments of the present invention neighboring tracks are associated with different randomizer seeds that produce different sets of pseudo-random data. Specifically, even tracks are associated with a first randomizer seed and odd tracks are associated with a second randomizer seed. For example, if the nominal track to be read is odd and was created using the randomizer seed 3FF, its two neighboring tracks will be even and will have been written using the randomizer seed 177 hexadecimal.

Under the present invention, if the read head mistakenly reads data from a neighboring track, the resulting read data produced by derandomizer 292 is so filled with errors that interface controller 202 can easily identify that a read error has occurred based upon the error correction codes embedded in the read data. By identifying such errors, the present invention reduces the occurrence of data miscompare errors.

In the description above, random number generating state machine 306 can be any one of a number of different random number generators that produce a consistent set of pseudo-random data given an initial randomizer seed. In preferred embodiments, a 10-bit cyclical shift register is used to produces the 8-bit bytes of pseudo-random data. Preferably, the first eight bits of the shift register are taken as the eight bits of pseudo-random data and the seventh and tenth bits of the past shift register state are exclusive-OR'd to produce the eighth bit. In addition, the shift register preferably shifts 8 times between each pseudo-random byte that the state machine generates.

Figure 9:
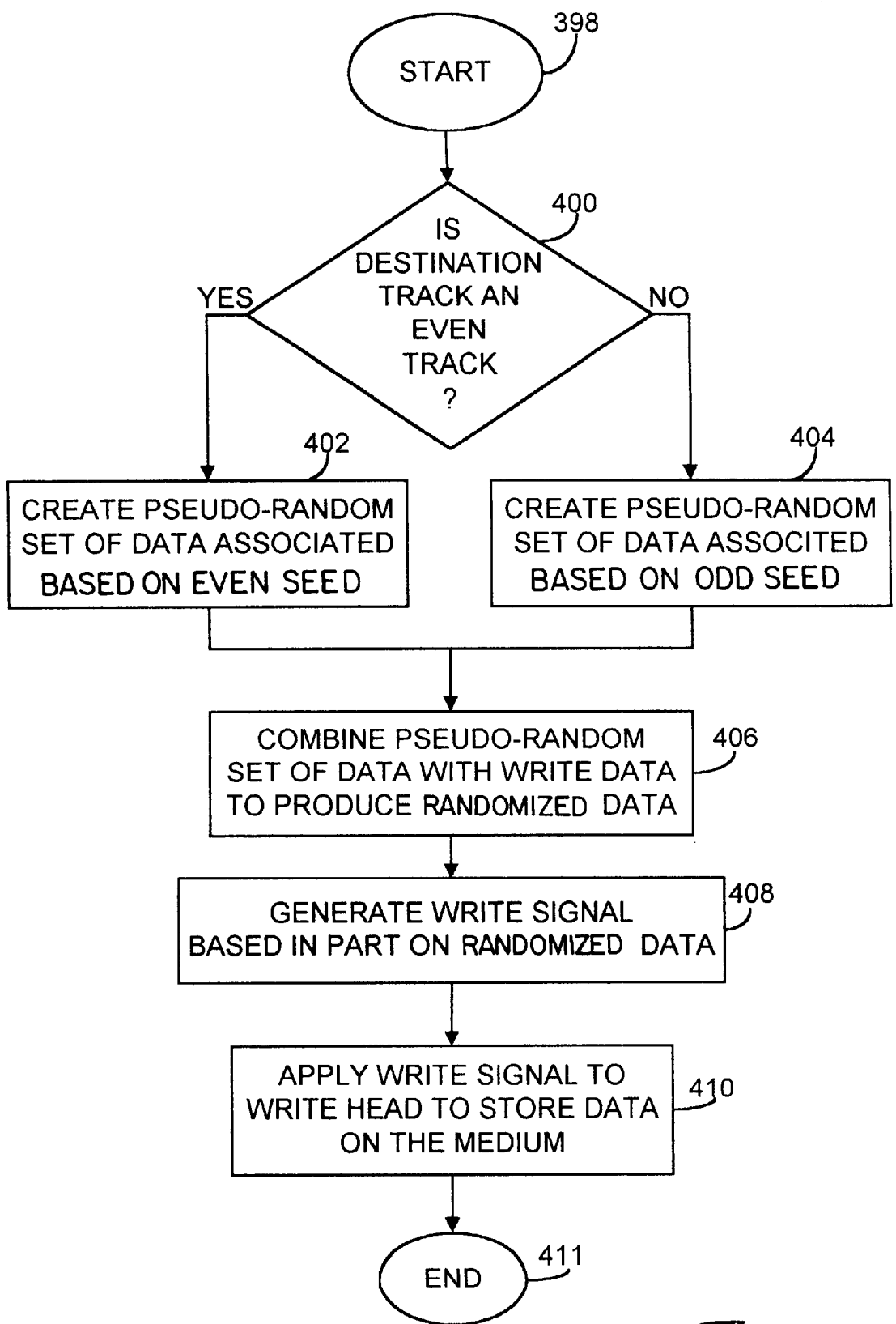
FIG. 9 is a flow diagram of the method of one embodiment of the present invention.

FIG. 9 is a flow diagram of the method of the present invention for reducing the occurrence of data miscompare errors. The method begins at step 398 and continues at step 400 where the storage device determines if the destination track is an even track or an odd track. If the destination track is an even track, the process continues at step 402 where a pseudo-random set of data associated with even tracks is produced based on the even seed. If the destination track is an odd track, the process continues at step 404 instead of step 402 and a pseudo-random set of data associated with odd tracks is produced based on the odd seed.

After either step 402 or step 404, the process continues at step 406 where the pseudo-random set of data is combined with write data to produce randomized data. At step 408, a write signal is generated that is based in part on the randomized data. The write signal is then applied to the write head to store data on the medium in the step 410. The process ends at step 411.

Figure 10:
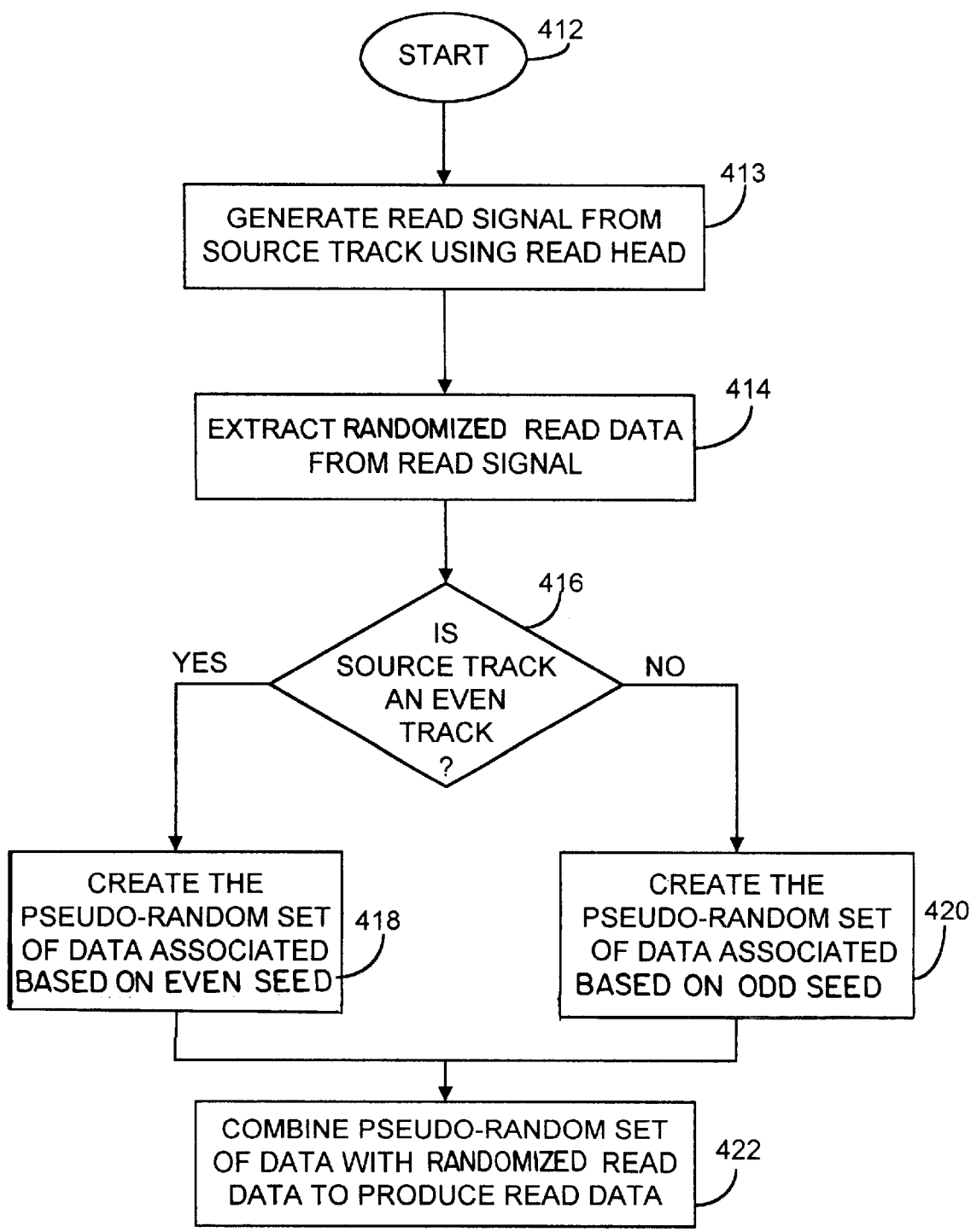
FIG. 10 is a flow diagram of the method of a further embodiment of the present invention.

FIG. 10 is a flow diagram of a further method of the present invention for reducing the occurrence of data miscompare errors that cooperates with the method of FIG. 9. The method of FIG. 10 begins at step 412 and continues at step 413 where a read signal is generated from a source track using a read head. In step 414, randomized read data is extracted from the read signal.

In step 416, the storage device determines if the source track is an even track or an odd track. For an even track, the process continues at step 418 where a pseudo-random set of data associated with even tracks is created based on the even seed. If the data that was read actually came from an even track, the pseudo-random set of data applied in step 418 matches the pseudo-random set of data used to randomize the write data before writing it to the track.

If the source track is an odd track, the process continues at step 420 instead of step 418. At step 420, a pseudo-random set of data associated with odd tracks is created based on the odd seed. If the data that was read actually came from an odd track, the pseudo-random set of data applied in step 420 matches the pseudo-random set of data used to randomize the write data before writing it to the track.

At step 422, the pseudo-random set of data is combined with the randomized read data to produce read data. This read data preferably includes ECC data.

In Table I below, column B shows the randomized write data resulting from the corresponding host write data in column A. Two groups of data are shown. The first group is the randomized data generated when the randomizer seed is 0x3FF and the second group is generated when randomizer seed is 0x177. Both groups have the same host data.

In a typical read operation, the randomized read data is decoded, then derandomized, using the same randomizer seed that was used while writing the data. Columns C and D show the results of this process. The derandomized read data that is sent to the host is shown in column D and is the same as the original data written for the host in column A. If the data was read without error, the error correction code will agree with the data and no error will be detected. If an error is detected, normal methods are used to recover the data.

If the seed used during a read operation is not the same seed that was used when the track was written, the derandomized data returned to the host will not be the same as the original host write data. Derandomized data generated from the same read data for two different seeds can be seen in column D and column F. As those columns show, using a different seed when reading than when writing creates extreme differences in the data provided to the host. When the derandomized data is so different from the original host data the error correction code does not agree with the data and an error is detected.

| A Original Host Write Data | B Random Write Data to Encoder | C Decoder Output, Random Read Data | D Derandom Read Data to Host | E Decoder Output, Random Read Data | F Derandom Read Data to Host |
|---|---|---|---|---|---|
| Write using seed = 0 × 3FF | | Read using seed = 0 × 3FF | | Read using seed = 0 × 177 | |
| 62 | 9D | 9D | 62 | 9D | EA |
| C1 | A2 | A2 | C1 | A2 | 75 |
| 91 | 98 | 98 | 91 | 98 | 2B |
| 00 | 59 | 59 | 00 | 59 | 62 |
| 6F | B2 | B2 | 6F | B2 | AF |
| 75 | 9F | 9F | 75 | 9F | D1 |
| Write using seed = 0 × 177 | | Read using seed = 0 × 177 | | Read using seed = 0 × 3FF | |
| 62 | 15 | 15 | 62 | 15 | EA |
| C1 | 16 | 16 | C1 | 16 | 75 |
| 91 | 22 | 22 | 91 | 22 | 2B |
| 00 | 3B | 3B | 00 | 3B | 62 |
| 6F | 72 | 72 | 6F | 72 | AF |
| 75 | 3B | 3B | 75 | 3B | D1 |

In summary, the present invention provides a method and a disc drive for reducing the occurrence of data miscompare errors. The method includes the steps of identifying a destination track 166, 164, and 168, as either an even track 164 or an odd track 166, 168. Write data 263 is combined with a pseudo-random set of data 320 to produce randomized data 322, where the pseudo-random set of data 320 is selected on the basis of whether the destination track 164 is an even track or an odd track. A write signal 279, based at least in part on randomized data 322, is written to the destination track 164.

In preferred embodiments, the method also includes identifying a source track as either an even track 164 or an odd track 166, 168 and reading from the source track to produce a read signal 281. Randomized read data 291 is extracted from the read signal 281 and is combined with a pseudo-random set of data 320 to produce read data 293. Pseudo-random set of data 320 is based on whether the source track is an even track or an odd track.

The present invention also provides for a storage device for storing information in tracks on a medium. The storage device includes an input circuit 202 capable of receiving input data from the host. An addressing circuit 204, 208 is also included that is capable of designating a destination track as either an even track or an odd track. A randomizer 306 coupled to the addressing circuit 204, 208 is capable of generating a first set of random data if the destination is an even track and a second set of random data if the destination is an odd track. Randomizer 306 is further capable of combining input data 263 with a set of random data 320 to produce randomized data 322. An output circuit 302, 268, 270, 272, 274, 278 coupled to randomizer 306 is capable of creating write data 279 from randomized data 322. A head 220, 216 is coupled to the output circuit and is capable of writing write data 279 to a destination track.

In preferred embodiments, randomizer 306 creates a set of pseudo-random data based on a randomizer seed.

In other preferred embodiments, a read head 220 for reading data 281 from a source track is coupled to a read circuit 280, 282, 288, 286, 290 that conditions the read signal 281 to produce randomized read data 291. A derandomizer 292 coupled to the read circuit is capable of combining the randomized read data 291 with set of random data 320 to produce derandomized read data 293.

Although the present invention has been described with reference to preferred embodiments, workers skilled in the art will recognize that changes may be made in form and detail without departing from the spirit and scope of the invention.

What is claimed is:

1. A storage device for storing information in tracks on a medium, the storage device comprising:
    an input circuit capable of receiving input data from a host and capable of creating storage data based on the input data;
    an addressing circuit capable of designating a destination track as either an even track or an odd track;
    a randomizer coupled to the addressing circuit and the input circuit and capable of generating a first set of random data if the destination track is an even track and a second set of random data if the destination track is an odd track and of combining storage data with a set of random data to produce randomized data;
    an output circuit coupled to the randomizer and capable of creating write data from the randomizer data; and
    a head coupled to the output circuit for writing the write data to the destination track.

2. The storage device of claim 1 wherein the randomizer comprises a state machine capable of repeatedly generating a particular set of random data.

3. The storage device of claim 2 wherein the state machine creates a set of random data based on a randomizer seed.

4. The storage device of claim 2 wherein the state machine uses the same method but different randomizer seeds to generate different sets of random data.

5. The storage device of claim 1 further comprising:
    a read head capable of reading read data from a source track to produce a read signal;
    a read circuit coupled to the read head for conditioning the read signal to produce randomized read data;
    a derandomizer, coupled to the read circuit and capable of combining the randomized read data with a set of random data from the randomizer to produce derandomized read data.

6. The storage device of claim 5 wherein the addressing circuit is capable of designating the source track as either an even track or an odd track and the randomizer is capable of generating the first set of random data if the source track is an even track and the second set of random data if the source track is an odd track.

7. The storage device of claim 6 wherein when the read head reads an even source track and the addressing circuit designates the source track as an odd track, the derandomized read data contains identifiable errors.

8. A method in a disc drive for reducing the occurrence of data miscompare errors, the method comprising steps of:
    (a) identifying a destination track as either an even track or an odd track;
    (b) combining write data with a pseudo-random set of data to produce randomized data, the pseudo-random set of data selected on the basis of whether the destination track is an even track or an odd track; and
    (c) writing to the destination track using a write signal that is based at least in part on the randomized data.

9. The method of claim 8 further comprising steps of:
    (d) identifying a source track as either an even track or an odd track;
    (e) reading from the source track to produce a read signal;
    (f) extracting randomized read data from the read signal; and
    (g) combining the randomized read data with a pseudo-random set of data to produce read data, the pseudo-random set of data selected on the basis of whether the source track is an even track or an odd track.

10. The method of claim 9 wherein for a particular track, the same pseudo-random set of data is used to produce the randomized data from the write data and to produce the read data from the randomized read data.

11. The method of claim 10 wherein the pseudo-random set of data is generated based upon a randomizer seed.

12. The method of claim 11 wherein the randomizer seed is selected on the basis of whether the destination track is an even track or an odd track.

13. The method of claim 8 further comprising a step of producing the write data by error correction code encoding input data.

14. The method of claim 13 wherein the write signal is produced in part by encoding the randomized data.

15. A method of encoding data for storage on a storage medium having tracks, the method comprising steps of:
    (a) creating error correction codes for the data and concatenating the error correction codes to the data to form unrandomized data;
    (b) identifying a category for a destination track where write data based on the unrandomized data is to be stored on the medium; and
    (c) creating randomized data by randomizing the unrandomized data using pseudo-randomized data that is selected based on the category identified for the destination track.

16. The method of claim 15 wherein the category identified for the destination track is selected from the group of categories consisting of even tracks and odd tracks and wherein the storage medium has alternating even and odd tracks.

17. A storage device for storing information in tracks on a medium, the storage device comprising:
    an input circuit coupled to a host processor to receive data for writing to the medium; and
    randomizing means, coupled to the input circuit for randomizing data received by the input circuit to reduce the occurrence of data miscompare errors by randomizing data in one manner if the destination track is an odd track and in a second manner if the destination track is an even track.

18. The storage device of claim 17 wherein the randomizing means comprises a state machine that randomizes data based on randomizer seeds and wherein the state machine uses one seed for randomizing data for an odd track and a second seed for randomizing data for an even track.

* * * * *